F. N. SMITH.
SADDLE FOR ATTACHING PIPES TO PIPE LINES.
APPLICATION FILED MAY 25, 1912.
1,048,364.
Patented Dec. 24, 1912.
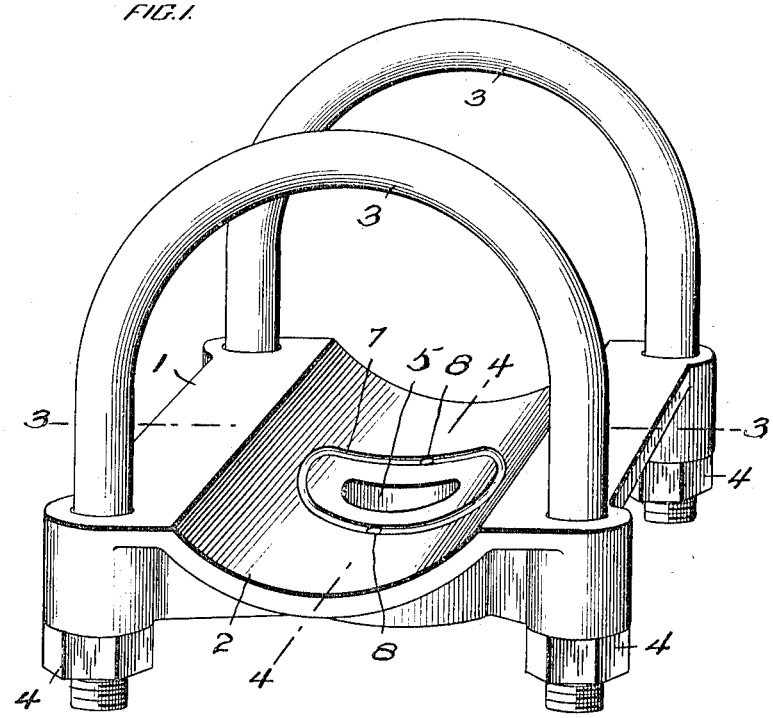
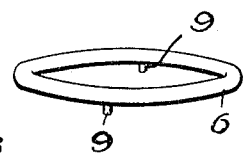
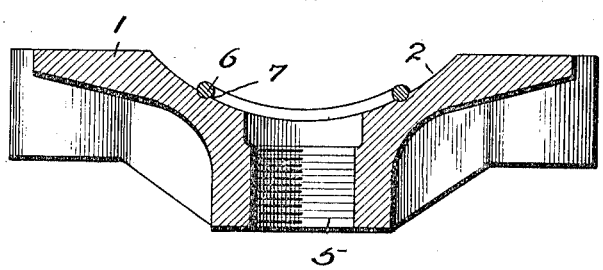
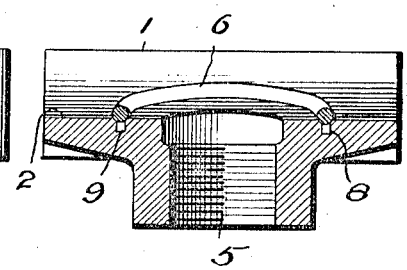
WITNESSES:
INVENTOR
Frank N. Smith
BY
Attorney

UNITED STATES PATENT OFFICE.

FRANK N. SMITH, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

SADDLE FOR ATTACHING PIPES TO PIPE-LINES.

1,048,364.  Specification of Letters Patent.  Patented Dec. 24, 1912.

Application filed May 25, 1912. Serial No. 699,796.

*To all whom it may concern:*

Be it known that I, FRANK N. SMITH, a citizen of the United States, residing at Bradford, in the county of McKean and State of Pennsylvania, have invented certain new and useful Improvements in Saddles for Attaching Pipes to Pipe-Lines; and I do hereby declare the following to be a full, clear, and exact description of the invention, such as will enable others skilled in the art to which it appertains to make and use the same.

My invention consists in the novel features hereinafter described reference being had to the accompanying drawing which illustrates one form in which I have contemplated embodying the invention and said invention is fully disclosed in the following description and claims.

Referring to the said drawing, Figure 1 represents a perspective view of a saddle embodying my invention with the gasket therefor removed from its seat. Fig. 2 is a detail perspective view of the gasket for the saddle shown in Fig. 1 before it is applied thereto. Fig. 3 is a section of the saddle block on line 3—3 of Fig. 1 with the gasket in place. Fig. 4 is a similar section on line 4—4, Fig. 1.

My invention relates to saddles for facilitating the attachment of a branch pipe to a pipe line without disturbing the line and the embodiment of my invention which I have selected for purposes of illustration herein, is a saddle adapted to be applied to a four inch pipe line for the purpose of connecting a one inch pipe thereto.

Referring to the drawing, 1 represents the saddle block, which is usually of cast metal and is provided with a curved central recess 2, concentric with the pipe upon which it is to be placed, in this instance a four inch pipe. The block is also provided preferably with two pairs of bolt holes, to receive the U-shaped yokes or bails 3, 3, the end portions of which are passed through said bolt holes and threaded to receive nuts 4, by means of which the saddle block is securely clamped to the pipe, the yokes or bails passing around the pipe. The central portion of the block 1 is provided with an aperture 5, communicating with the curved recess 2, and threaded to receive the smaller pipe, in this case a one inch pipe. In order to make a tight joint between the saddle block and the exterior of the pipe I employ a gasket 6 which is formed of soft metal such as lead, of circular form and which engages an annular gasket receiving portion of the recess 2 of the saddle block surrounding the aperture 5. As these saddles are frequently attached to pipe lines in trenches and other places where access is difficult for a workman, it is desirable to secure the gasket in place so that the saddle may be applied in a position most advantageous to the workman in turning the nuts, and so that the entire saddle may be turned on the pipe or moved on the same before the nuts are completely screwed up, to bring the saddle into the required position, without disturbing the gasket. To this end I preferably provide the saddle block with an annular gasket receiving recess 7 in the curved face 2, surrounding the aperture 5, to receive the gasket 6 and in said recess I provide one or more interlocking sockets or holes 8, 8 to receive teats or projections 9, 9 on the gasket 6, as shown in Figs. 2, 3 and 4. The teats or projections 9, 9 are made of such size and shape with respect to the holes 8, 8 as to fit therein tightly, that is to say with considerable friction, so as to hold the gasket firmly in position.

The gasket 6 may be shaped to conform to the curved face 2, and annular packing recess 7 when made, if desired, but I prefer to form the gasket as a plain ring of lead, preferably circular in cross section with the frictional interlocking projections 9 extending on one side of the same, as shown in Fig. 2, and the gasket being composed of soft metal, it can be readily pressed into the gasket receiving recess 7, the teats or projections being firmly pressed into the interlocking sockets 8, 8 of the saddle block by hand. This may be done by the operator just previous to applying the saddle to the pipe, or it may be done at the place of manufacture, if desired, and the saddles sent out ready for attachment. I prefer, however, to have the gasket inserted at the time of applying the saddle.

The frictional and interlocking engagement of the teats or projections 9 of the gasket and the sockets 8 of the saddle block will cause the gasket to be held and retained in operative position while the saddle is being applied, and will permit the saddle to be moved around or along the pipe without detaching or disturbing the position of the gasket.

It will be understood that after the nuts are screwed up tightly and the gasket is firmly compressed between the saddle block and the exterior of the pipe to which it is applied, a hole of slightly smaller diameter than the aperture 5 is drilled in the pipe wall, the drill being inserted through aperture 5, and a pipe is then screwed into the aperture 5 to complete the connection.

What I claim and desire to secure by Letters Patent is:—

1. In a saddle for connecting pipes to pipe lines, the combination with a saddle block provided with a curved pipe engaging face, having an aperture therein and an annular gasket receiving portion surrounding said aperture and means for clamping the saddle to a pipe, of a gasket of soft metal adapted to fit said annular gasket receiving portion, said portion and said gasket being provided with interlocking devices for holding the gasket in position with respect to said aperture in said block.

2. In a saddle for connecting pipes to pipe lines, the combination with a saddle block provided with a curved pipe engaging face, having an aperture therein and an annular gasket receiving portion surrounding said aperture and means for clamping the saddle to a pipe, of a gasket of soft metal adapted to fit said annular gasket receiving portion, said portion and said gasket being provided with frictionally engaging interlocking devices for holding the gasket in position with respect to said block.

3. In a saddle for connecting pipes to pipe lines, the combination with a saddle block provided with a curved pipe engaging face, having an aperture therein, an annular gasket receiving portion surrounding said pipe aperture, said annular gasket receiving portion being provided at separated points with sockets extending into the saddle block, and means for clamping said block upon a pipe, of a gasket of soft metal provided at points registering with said sockets, with projections to enter said sockets for holding the gasket in position with respect to the said block.

4. In a saddle for connecting pipes to pipe lines, the combination with a saddle block provided with a curved pipe engaging face, having an aperture therein, an annular gasket receiving portion surrounding said pipe aperture, said annular gasket receiving portion being provided at separated points with sockets extending into the saddle block, and means for clamping said block upon a pipe, of a gasket of soft metal provided at points registering with said sockets, with projections formed integrally therewith, and of such size and shape as to frictionally fit said sockets and hold the gasket in position with respect to said block.

In testimony whereof I affix my signature in the presence of two witnesses.

FRANK N. SMITH.

Witnesses:
H. M. WICK,
M. E. CLARK.